(12) United States Patent
Tanaka et al.

(10) Patent No.: US 11,286,873 B2
(45) Date of Patent: Mar. 29, 2022

(54) CONTROL DEVICE

(71) Applicant: DENSO CORPORATION, Kariya (JP)

(72) Inventors: Makoto Tanaka, Kariya (JP); Masatake Wada, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 17/340,421

(22) Filed: Jun. 7, 2021

(65) Prior Publication Data
US 2021/0293198 A1 Sep. 23, 2021

Related U.S. Application Data

(63) Continuation of application No. PCT/JP2019/047482, filed on Dec. 4, 2019.

(30) Foreign Application Priority Data

Dec. 10, 2018 (JP) .............................. JP2018-230991

(51) Int. Cl.
F02D 41/02 (2006.01)
F02D 41/20 (2006.01)
F02D 41/24 (2006.01)
F02D 41/14 (2006.01)

(52) U.S. Cl.
CPC ...... F02D 41/2467 (2013.01); F02D 41/0275 (2013.01); F02D 41/1475 (2013.01); F02D 41/20 (2013.01); F02D 41/247 (2013.01); F02D 41/2445 (2013.01); F02D 41/2448 (2013.01); F02D 2041/2055 (2013.01); F02D 2041/2058 (2013.01); F02D 2200/0602 (2013.01); F02D 2250/31 (2013.01)

(58) Field of Classification Search
CPC .. F02D 41/027; F02D 41/0275; F02D 41/028; F02D 41/1475; F02D 41/2445; F02D 41/2448; F02D 41/2467; F02D 41/247; F02D 2200/0602; F02D 2250/31; F02D 2041/2034; F02D 2041/2055; F02D 2041/2058
USPC ............ 701/104, 105; 123/490, 674; 60/284
See application file for complete search history.

(56) References Cited

U.S. PATENT DOCUMENTS

| 2008/0148712 | A1  | 6/2008 | Wada et al.            |
|--------------|-----|--------|------------------------|
| 2015/0073682 | A1  | 3/2015 | Ito                    |
| 2018/0111087 | A1* | 4/2018 | Nakada ......... F01N 3/0842 |
| 2018/0209373 | A1  | 7/2018 | Yoshiume et al.        |

FOREIGN PATENT DOCUMENTS

| JP | 2000-130230 | 5/2000 |
| JP | 2002-201992 | 7/2002 |
| JP | 2005-163549 | 6/2005 |

* cited by examiner

Primary Examiner — Erick R Solis
(74) Attorney, Agent, or Firm — Nixon & Vanderhye P.C.

(57) ABSTRACT

A control device includes a drive unit configured to supply electric power to a fuel injection valve to perform valve open drive to supply fuel to a combustion chamber of an internal combustion engine; and a correction unit configured to correct a fuel injection amount of the fuel injection valve. The correction unit is configured to learn the fuel injection amount of the fuel injection valve when NOx purge is performed to reduce and purify the NOx occlusion catalyst.

10 Claims, 7 Drawing Sheets

CONTROL DEVICE

CROSS REFERENCE TO RELATED APPLICATION

The present application is a continuation application of International Patent Application No. PCT/JP2019/047482 filed on Dec. 4, 2019, which designated the U.S. and claims the benefit of priority from Japanese Patent Application No. 2018-230991 filed on Dec. 10, 2018. The entire disclosures of all of the above applications are incorporated herein by reference.

TECHNICAL FIELD

The present disclosure relates to a control device.

BACKGROUND

Conventionally, an internal combustion engine is provided with a fuel injection valve for each cylinder for injecting fuel into a combustion chamber.

SUMMARY

A control device according to an aspect of the present disclosure includes a drive unit configured to supply electric power to a fuel injection valve to perform valve open drive to supply fuel to a combustion chamber of an internal combustion engine.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
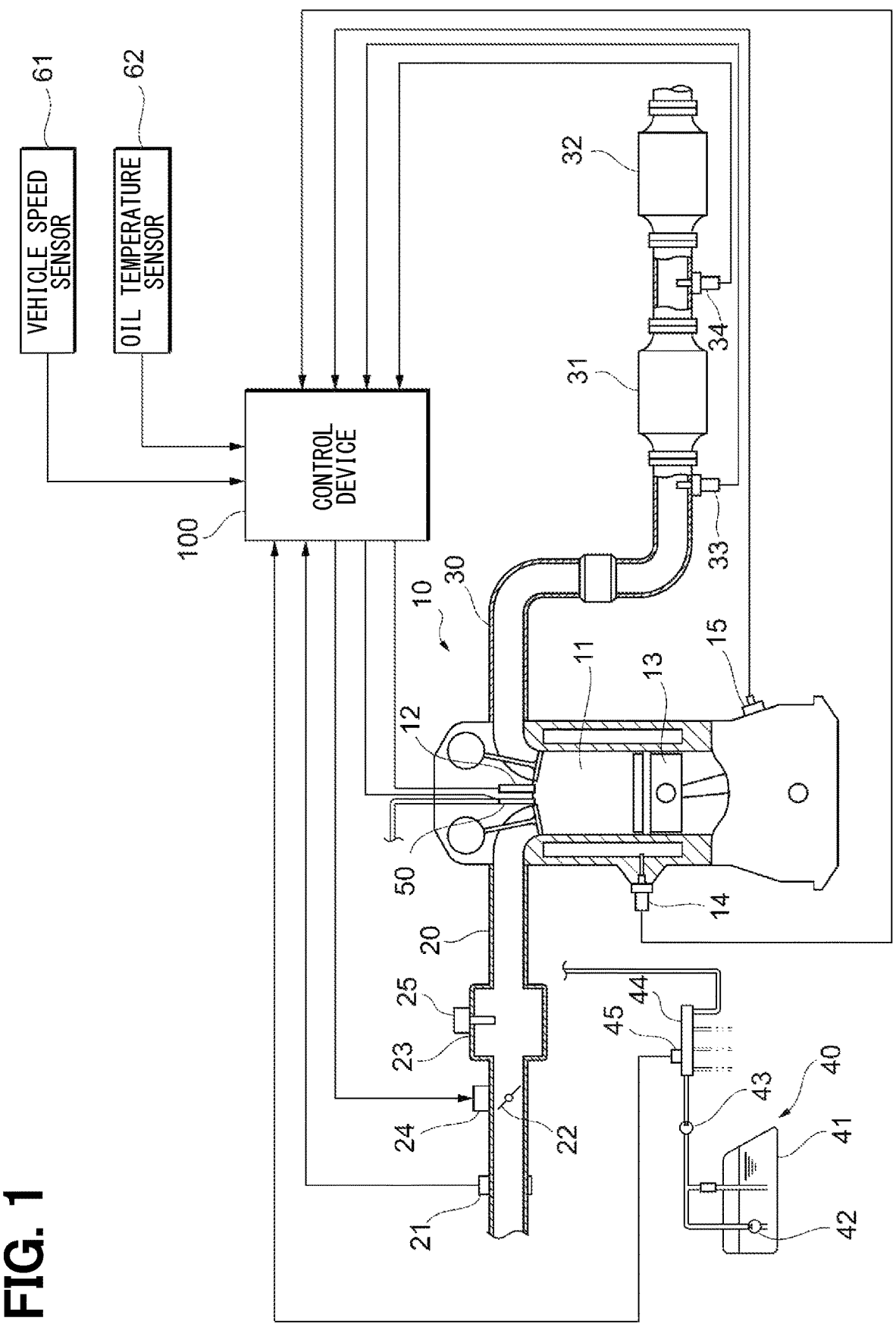
FIG. 1 is a diagram showing a configuration of a vehicle provided with a control device according to an embodiment of the present disclosure.

As follows, examples of the present disclosure will be described.

According to an example of the present disclosure, an internal combustion engine is provided with a fuel injection valve for each cylinder for injecting fuel into a combustion chamber. In each of the fuel injection valves, a valve body is driven according to a control signal supplied from a control device to switch between a valve open state and a valve close state, thereby to adjust a fuel injection amount. In the fuel injection valve, the injection amount may vary due to individual differences and deterioration of the fuel injection valve. In a case where the injection amount varies, exhaust emissions and drivability may deteriorate. Therefore, a control device that includes a fuel injection valve as a control object is required to appropriately correct the injection amount according to the state of each fuel injection valve and reduce the variation in the injection amount.

According to an example of the present disclosure, a fuel injection control device may detect a current flowing through a drive coil of the fuel injection valve and may adjust a peak value of the current at a target value based on an inclination of change in the detected current. In this way, the device may suppress excess or deficiency of the injection amount.

It is noted that, a temperature of the internal combustion engine is at a room temperature immediately after its start, however, after the internal combustion engine is warmed up, the temperature gradually rises from a temperature in the transient operation state to a temperature in the steady operation state. At this time, a temperature of the fuel injection valve provided in the internal combustion engine also rises, and therefore, an electrical characteristics of the fuel injection valve fluctuate. For example, in a drive coil of a fuel injection valve, a resistance value increases as the temperature rises, and therefore, the rise in a current flowing through the drive coil is delayed, and a time until the peak current reaches becomes long. In this way, an electromagnetic energy that is a time integration value of the current flowing through the drive coil increases, and the applied voltage increases. As a result, the injection amount may be increased.

In this regard, according to an example of the present disclosure, the injection amount may be corrected during warm-up of the catalyst. In this example, for example, in a lean state where the temperature is higher than the temperature during warm-up, appropriate correction may not be made, and the injection amount may vary.

According to an example of the present disclosure, a control device comprises: a drive unit configured to supply electric power to a fuel injection valve to perform valve open drive to supply fuel to a combustion chamber of an internal combustion engine; and a correction unit configured to correct a fuel injection amount of the fuel injection valve. A NOx occlusion catalyst is provided in an exhaust pipe of the internal combustion engine to occlude NOx in exhaust gas flowing through the exhaust pipe and to reduce and purify occluded NOx. The correction unit is configured to learn the fuel injection amount of the fuel injection valve when NOx purge is performed to reduce and purify the NOx occlusion catalyst.

In the present example, the injection amount is corrected during the traveling in the lean state and during the execution of the NOx purge in which the air-fuel ratio temporarily fluctuates to the fuel-rich side. In other words, the injection amount is corrected after the temperature of the internal combustion engine has risen and in a state where combustion is relatively stable. Therefore, the accuracy of the correction in the lean state is improved as compared with the configuration in which the injection amount is corrected in the warm-up state or in the stoichiometric state, for example.

Hereinafter, the present embodiment will be described with reference to the attached drawings. In order to facilitate understanding, the same reference numerals are attached to the same constituent elements in each drawing where possible, and redundant explanations are omitted.

The control device 100 according to an embodiment of the present disclosure will be described with reference to FIG. 1. The control device 100 is attached to a part of the vehicle and controls combustion of fuel.

The vehicle includes an internal combustion engine 10, an intake pipe 20, an exhaust pipe 30, and a fuel device 40.

The internal combustion engine 10 is a 4-cycle reciprocating engine including a multiple cylinders. The internal combustion engine 10 mixes air and liquid fuel in a combustion chamber 11 to generate an air-fuel mixture. A piston 13 is driven by igniting and burning the air-fuel mixture with ignition of a spark plug 12. A driving force of the vehicle is generated by the driving of the piston 13. The configurations of the cylinders are substantially the same, and therefore, one of the cylinders is shown as the "internal combustion engine 10" in FIG. 1.

Various sensors such as a water temperature sensor 14 and a crank angle sensor 15 are attached to each cylinder of the internal combustion engine 10. The water temperature sensor 14 is a temperature sensor for measuring the temperature of cooling water circulating between the radiator (not shown) and the internal combustion engine 10. The crank angle sensor 15 is a sensor for measuring a rotation angle of a crankshaft included in the cylinder. The crank angle sensor 15 also functions as a sensor for measuring the engine speed. Each measured value measured by these sensors is input to the control device 100.

The internal combustion engine 10 is provided with a fuel injection valve 50. The fuel injection valve 50, which is also called an injector, is a solenoid valve for injecting fuel into the combustion chamber 11 in the cylinder of the internal combustion engine 10. The fuel injection valve 50 is supplied with fuel pressurized with the high-pressure pump 43, which will be described later. When the fuel injection valve 50 is opened, the fuel is injected from its tip and is supplied into the combustion chamber 11 while being mixed with air. The control device 100 controls the valve open drive of the fuel injection valve 50 to adjust the amount of fuel supplied to the combustion chamber 11. The details of the operation of the fuel injection valve 50 will be described later.

The intake pipe 20 is a pipe for supplying air to the internal combustion engine 10. The intake pipe 20 is provided with an air flow meter 21, a throttle valve 22, and a surge tank 23 in this order from the upstream side where air is introduced. The internal combustion engine 10 is connected to the downstream end of the intake pipe 20.

The air flow meter 21 is a flow meter for measuring the flow rate of air supplied to the internal combustion engine 10 through the intake pipe 20. The flow rate measured by the air flow meter 21 is input to a control device 100.

The throttle valve 22 is a flow rate adjusting valve for adjusting the flow rate of air passing through the intake pipe 20. The opening degree of the throttle valve 22 is adjusted according to an amount of an operation of an accelerator pedal (not shown) provided in the vehicle, whereby the air flow rate is adjusted. The throttle valve 22 is provided with an opening degree sensor 24. The opening degree of the throttle valve 22 is measured by using the opening degree sensor 24 and is input to the control device 100.

The surge tank 23 is a box-shaped container formed in the middle of the intake pipe 20. The intake pipe 20 is branched into multiple parts on the downstream side of the surge tank 23, and the branched flow paths are connected to the cylinders respectively. The internal space of the surge tank 23 is larger than the internal space of other parts of the intake pipe 20. The surge tank 23 prevents pressure fluctuations from one cylinder from affecting the other cylinders. The surge tank 23 is provided with a pressure sensor 25. The intake pressure in the intake pipe 20 is measured with the pressure sensor 25 and input to the control device 100.

The exhaust pipe 30 is a pipe for discharging exhaust gas generated in the cylinder of the internal combustion engine 10 to the outside. The upstream end of the exhaust pipe 30 is connected to the internal combustion engine 10. A three-way catalyst 31 and a NOx occlusion catalyst 32 for purifying the exhaust gas are provided in order in the middle of the exhaust pipe 30.

The three-way catalyst 31 purifies nitrogen oxides (NOx), carbon monoxide (CO), and hydrocarbons (HC) contained in the exhaust gas flowing through the exhaust pipe 30 when the air-fuel ratio is close to a stoichiometric state.

The NOx occlusion catalyst 32 occludes NOx contained in the exhaust gas when the air-fuel ratio is in a lean state. The NOx occlusion catalyst 32 reduces and purifies the NOx occluded when the air-fuel ratio is in a relatively rich state including a stoichiometric state or a rich state, and releases the purified gas. The operation, in which the fuel injected from the fuel injection valve 50 is temporarily increased when the air-fuel ratio is in the lean state and in which the air-fuel ratio is set to the fuel-rich side to reduce and purify NOx and release the purified gas, is also referred to "NOx purge". For example, the control device 100 may perform the NOx purge control to perform NOx purge when at least one of the conditions is satisfied: the NOx storage amount in the NOx occlusion catalyst 32 is equal to or more than a predetermined amount; a request arises to switch the air-fuel ratio to the stoichiometric state; and the target value of the excess air ratio $\lambda$ is less than or equal to a predetermined value (that is, the fuel rich state).

Air-fuel ratio sensors 33 and 34 are provided in an upstream portion of the three-way catalyst 31 and a portion between the three-way catalyst 31 and the NOx occlusion catalyst 32 in the exhaust pipe 30. The air-fuel ratio sensors 33 and 34 are sensors for measuring an oxygen concentration of exhaust gas passing through the exhaust pipe 30, and the measurement results thereof are input to the control device 100. The control device 100 controls the injection amount of the fuel injection valve 50 based on the measurement results of the air-fuel ratio sensors 33 and 34 and the like so that the combustion in the internal combustion engine 10 is performed at the target air-fuel ratio.

The fuel device 40 includes a fuel tank 41, a feed pump 42, a high-pressure pump 43, a pressure accumulator chamber 44, and a fuel pressure sensor 45. Fuel stored in the fuel tank 41 is pumped up with the feed pump 42, which is an electromagnetically driven low-pressure pump and is introduced into the high-pressure pump 43 via the low-pressure pipe. The fuel introduced into the high-pressure pump 43 is pressurized in the high-pressure pump 43 and then pumped into the pressure accumulator chamber 44. The pressure-fed high-pressure fuel is stored in the pressure accumulator chamber 44 in a high-pressure state, and then supplied to the fuel injection valve 50 provided in each cylinder.

The fuel pressure sensor 45 is a sensor for measuring the fuel pressure in the pressure accumulator chamber 44. The fuel pressure value measured with the fuel pressure sensor 45 is input to the control device 100.

The control device 100 includes, for example, an electronic control unit (ECU: Electronic Control Unit) including a microcomputer, and performs various controls related to the internal combustion engine 10 based on the measured values input from the various sensors as described above. In addition to the various sensors as described above, measured values are input to the control device 100 from a vehicle speed sensor 61 and an oil temperature sensor 62. The vehicle speed sensor 61 is a sensor that measures a vehicle speed of a vehicle on which the control device 100 is mounted, and outputs the vehicle speed as a measured value to the control device 100. The oil temperature sensor 62 is a sensor that measures an oil temperature of lubricating oil of the internal combustion engine 10, and outputs data indicating the oil temperature as a measured value to the control device 100. The control device 100 estimates the engine torque and computes the engine torque as an estimated value. The control device 100 measures a battery voltage of a battery (not shown) provided in a vehicle on which the control device 100 is mounted, or receives a measured value of the battery voltage from another control device that has measured the battery voltage, thereby to acquire the values as a measured value.

The control device 100 computes a target air-fuel ratio according to the operating state of the vehicle, and controls the valve open drive of the fuel injection valve 50 such that the injection amount approaches the target injection amount satisfying the computed target air-fuel ratio. The control device 100 adjusts a period during which the fuel injection valve 50 is open by, for example, adjusting a length of time for supplying electric power to the fuel injection valve 50, thereby to cause the injection amount to match a predetermined target value.

However, the relationship between the time during which electric power is supplied to the fuel injection valve and the injection amount is not constant, and variations may occur due to individual differences and deterioration of the fuel injection valve, ambient temperature, and the like. In particular, in the case of injection in which the target injection amount is very small and in which the opening degree of the fuel injection valve 50 does not become a maximum degree, the variation in the injection amount tends to be large. Therefore, in order to bring the actual injection amount closer to the target value, it is necessary to correct the injection amount according to the state of the fuel injection valve. The correction of the injection amount by the control device 100 will be described below.

Figure 2:
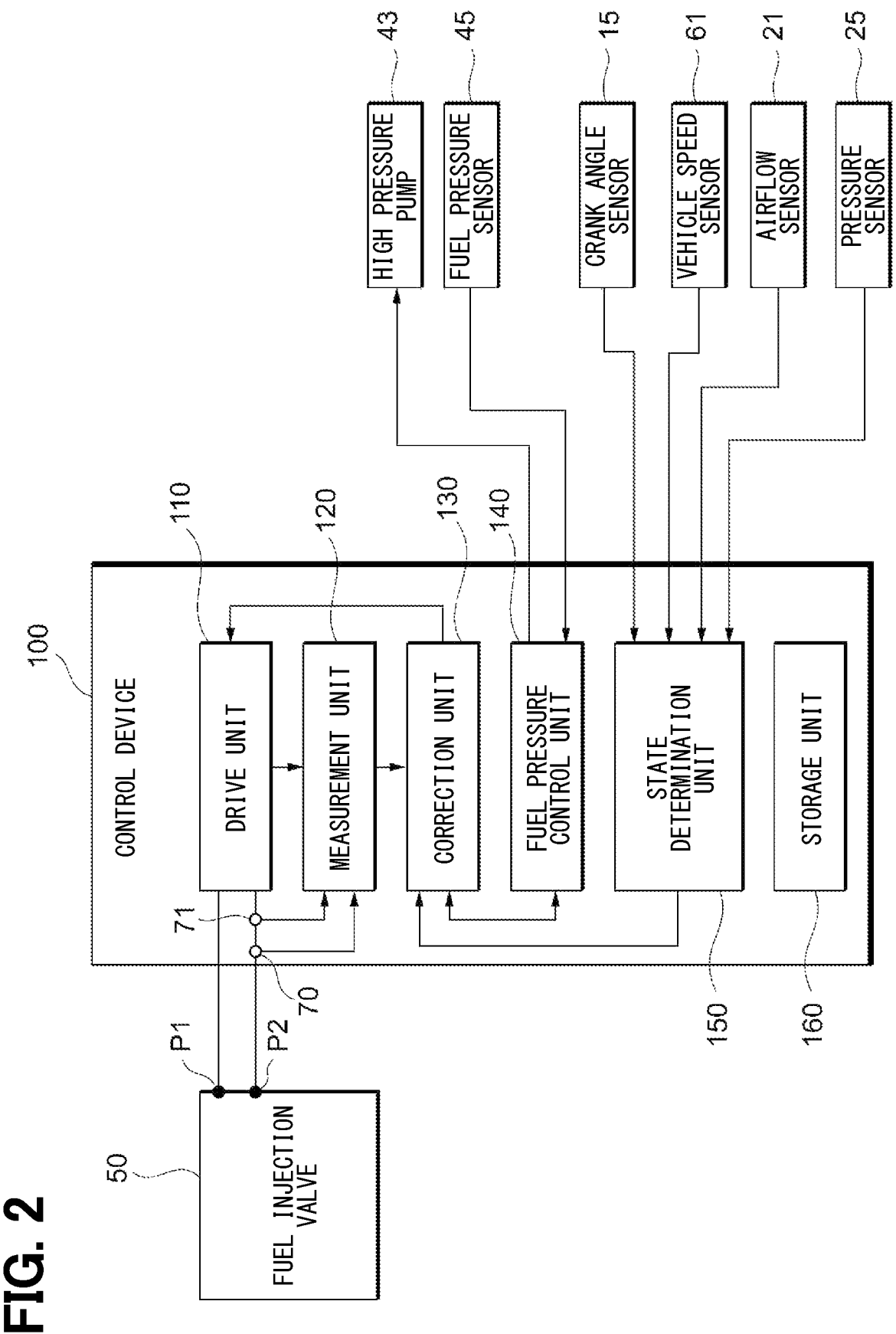
FIG. 2 is a diagram showing functional blocks of the control device shown in FIG. 1.

FIG. 2 is a diagram showing input of measured values from the functional blocks of the control device 100 and various sensors. As shown in FIG. 2, the control device 100 includes a drive unit 110, a measurement unit 120, a correction unit 130, a fuel pressure control unit 140, a state determination unit 150, and a storage unit 160.

The drive unit 110 generates an injection pulse that controls the valve open drive and the valve close drive of the fuel injection valve 50, and supplies electric power to the fuel injection valve 50 based on the injection pulse to drive valve open and valve close of the fuel injection valve 50. Specifically, the drive unit 110 applies a rectangular wave-shaped drive voltage between a positive terminal P1 and a negative terminal P2 provided on the fuel injection valve 50 while the injection pulse is on. A drive current flows through the drive coil provided in the fuel injection valve 50 in response to the application of the drive voltage, and the electromagnetic force generated by the drive current causes the electromagnetic fuel injection valve 50 to open. The valve open drive and the valve close drive of the fuel injection valve 50 will be described in more detail with reference to FIGS. 3 and 4.

Figure 3:
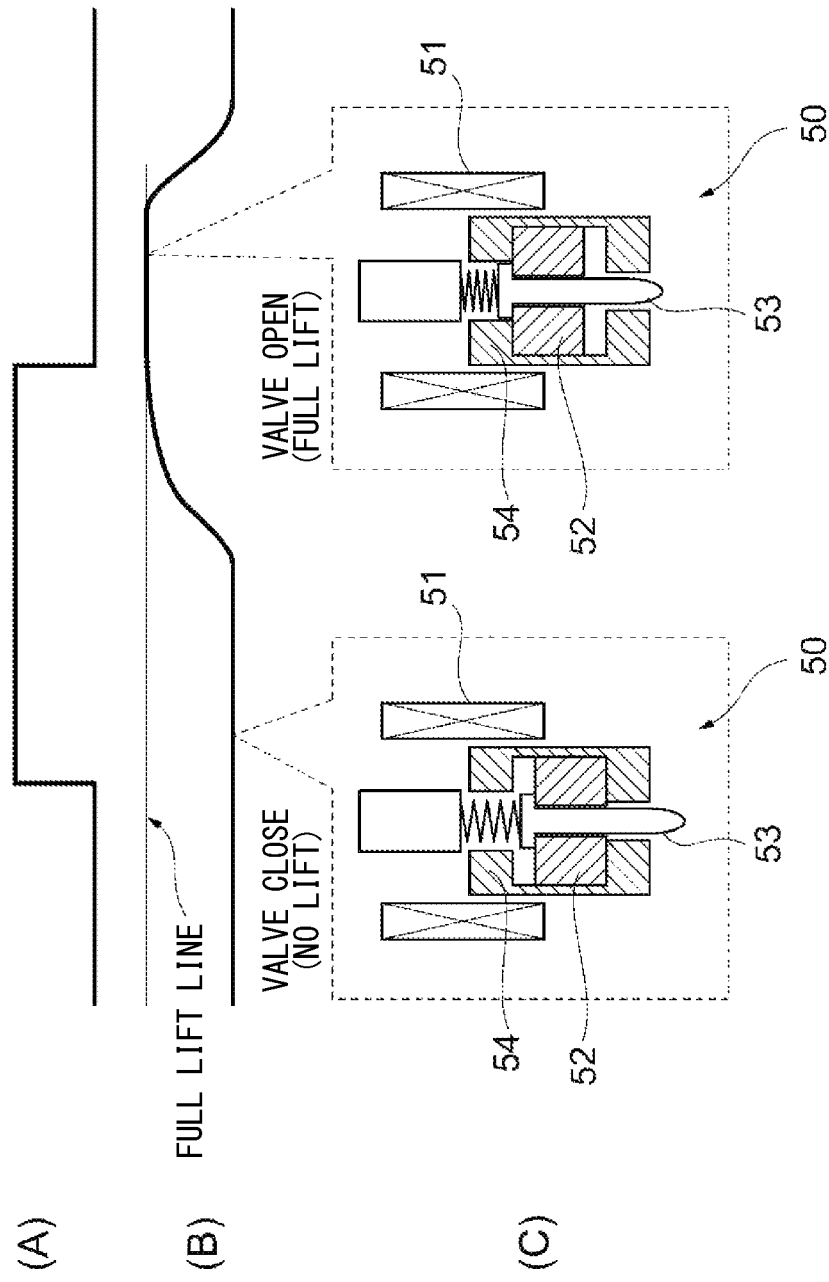
FIG. 3 is a diagram for explaining full lift injection.
Figure 4:
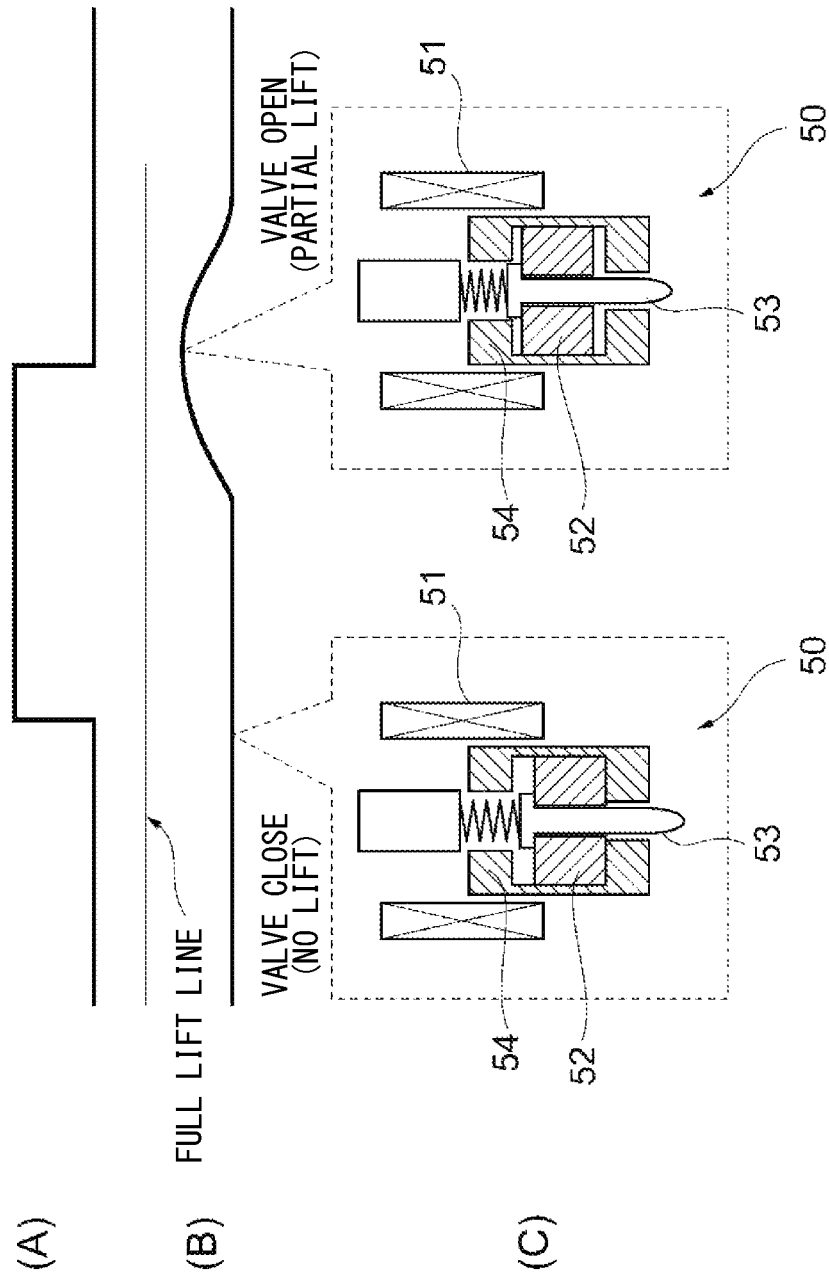
FIG. 4 is a diagram for explaining partial lift injection.

(A) in FIG. 3 shows an injection pulse applied to the fuel injection valve 50. (B) in FIG. 3 shows a lift amount of the fuel injection valve 50. (C) in FIG. 3 shows a behavior of the fuel injection valve 50. (A) in FIG. 4 shows an injection pulse applied to the fuel injection valve 50. (B) in FIG. 4 shows a lift amount of the fuel injection valve 50. (C) in FIG. 4 shows a behavior of the fuel injection valve 50.

As shown in (C) in FIG. 3, the fuel injection valve 50 includes a drive coil 51 that generates an electromagnetic force on supply of electric power, a movable core 52 that is driven by the electromagnetic force, a moving valve body 53 that integrally moves with the movable core 52, and a stopper 54 that stops drive of the movable core 52. When the power supply to the drive coil 51 is started with the rise of the injection pulse, an electromagnetic force is generated in the drive coil 51, and the movable core 52 and the valve body 53 are lifted by the electromagnetic force. As a result, the valve body 53 moves to a valve open position, and therefore, the fuel injection valve 50 is opened and fuel injection is performed. When the power supply to the drive coil 51 is stopped with a falling edge of the injection pulse, the valve body 53 is pushed back by the spring. As a result, the valve body 53 returns to a close position, and therefore, the fuel injection valve 50 is closed and the fuel injection is stopped.

A time (injection pulse width) during which the injection pulse is in the ON state is different between FIGS. 3 and 4. When the injection pulse width is sufficiently long as shown in (A) in FIG. 3, the movable core 52 abuts on the stopper 54 and the valve body 53 reach a full lift position, as shown in (B) and (C) in FIG. 3. The injection at this time is referred to as a full lift injection. On the other hand, when the injection pulse width is short as shown in (A) in FIG. 4, the movable core 52 is raised only to a state before the movable core 52 abuts on the stopper 54, as shown in (B) and (C) in FIG. 4. Therefore, the valve body 53 does not reach the full lift position and is in a partial lift state. The injection at this time is referred to as a partial lift injection.

Referring back to FIG. 2, the measurement unit 120 is a unit that measures the drive current flowing through the drive coil 51 with a current sensor 70 and measures the voltage generated on the negative terminal P2 with a voltage sensor 71. The measurement unit 120 computes at least one of a valve open timing and a valve close timing of the fuel injection valve 50 based on at least one of the measured drive current and the measured drive voltage. The valve open timing of the fuel injection valve 50 includes a valve open start timing and a valve open completion timing. The valve open timing of the fuel injection valve 50 includes a valve close start timing and a valve close completion timing.

Specifically, the drive current flowing through the drive coil 51 gradually increases after the rise of the injection pulse. Then, the valve open operation of the fuel injection valve 50 is started at the timing when the maximum current value, which is a predetermined target value, is reached or at the timing immediately before that. After that, the drive current gradually decreases. However, the drive current starts to increase at the timing when the opening of the fuel injection valve 50 is completed. Therefore, it is known that an inflection point occurs in the current waveform at this time. Therefore, the measurement unit 120 computes the valve open completion timing of the fuel injection valve 50 based on the inflection point generated in the current waveform. The measurement unit 120 may compute, for example, the valve open speed of the fuel injection valve 50 based on the change in the drive current while the fuel injection valve 50 performs the valve open drive. Further, the valve open start timing may be computed based on the computed valve open speed and the valve open completion timing. By measuring the drive current with the current sensor 70 in this way, the valve open start timing of the fuel injection valve 50 can be computed.

It is known that when the injection pulse is turned off, an induced electromotive force is generated at the negative terminal P2 as the drive current is forcibly dropped to 0 and that an inflection point occurs in the voltage waveform of the negative terminal P2. That is, the timing corresponding to the inflection point of the voltage waveform of the negative terminal P2 is equal to the timing when the valve close of the valve body 53 is completed. Therefore, the valve close completion timing of the fuel injection valve 50 can be computed by measuring the voltage generated at the negative terminal P2 by using the voltage sensor 71 and by computing the inflection point generated in the voltage waveform.

The valve open start timing and valve close completion timing of the fuel injection valve 50 computed by the measurement unit 120 are input to the correction unit 130. The measurement unit 120 may be configured to measure either the drive current or the drive voltage and to input either the valve open start timing or the valve close completion timing to the correction unit 130.

The correction unit 130 is a portion that corrects the injection amount by correcting the power supply of the drive unit 110 to the fuel injection valve 50 based on the measurement result of the measurement unit 120. Specifically, the correction unit 130 estimates the injection amount of the fuel injection valve 50 based on at least one of the computed valve open start timing and computed valve close completion timing. Estimation of the injection amount may be made, such that, for example, data indicating the relationship between the valve open start timing and the injection amount of a nominal product is stored in the storage unit 160 in advance, and that the correction unit 130 refers to the stored data thereby to estimate the injection amount of the fuel injection valve 50. Instead of or in addition to this, data indicating the relationship between the valve close completion timing and the injection amount of the nominal product may be stored in the storage unit 160 in advance, and the correction unit 130 may estimate the injection amount of the fuel injection valve 50 by referring to the stored data.

Subsequently, the correction unit 130 corrects the power supply by the drive unit 110 as necessary so that the difference between the estimated injection amount and the target injection amount becomes small. The correction of the power supply includes, for example, correction of at least one of the pulse width of the injection pulse, correction of the maximum value of the drive voltage applied to the fuel injection valve, and correction of the maximum value of the drive current flowing through the drive coil. The correction unit 130 learns the injection amount by storing the computed correction value in the storage unit 160 while repeatedly executing the above-mentioned correction for multiple times. The timing at which the correction unit 130 corrects the injection amount will be described later.

The fuel pressure control unit 140 is a portion that controls the fuel pressure of fuel supplied to the fuel injection valve 50 based on the fuel pressure measured by using the fuel pressure sensor 45. The fuel pressure control unit 140 is configured to adjust the fuel pressure by controlling the high pressure pump 43.

The state determination unit 150 is a portion that determines whether the internal combustion engine 10 is in a steady operation state or in a transient operation state. Determination of the driving condition is made based on a parameter that is, for example, the estimated engine torque, the engine speed input from the crank angle sensor 15, the engine load computed from the engine speed and the injection amount, the vehicle speed input from the vehicle speed sensor 61, the intake flow rate input from the air flow meter 21, the intake pressure input from the pressure sensor 25, and the required fuel injection amount. The state determination unit 150 determines that the internal combustion engine 10 is in the transient operation state when the amount of change or the rate of change of at least one of these parameters exceeds a predetermined value. It should be noted that each of the above-mentioned parameters may be a required value instead of the actually measured value.

The storage unit 160 stores data indicating the relationship between at least one of the valve open start timing, the valve close completion timing, and the valve open period of the nominal product and the injection amount. The storage unit 160 stores the correction value computed by the correction unit 130.

Next, the timing at which the learning of the injection amount is performed in the present embodiment will be described. First, the correction unit 130 learns the injection amount while traveling in the lean state and when the NOx purge is performed. The fuel concentration in the lean state is lower than that in the stoichiometric state or in the rich state, and therefore, high accuracy is required for controlling the injection amount of the fuel injection valve 50. Herein, the internal combustion engine 10 is at room temperature immediately after its start. To the contrary, after warming up the internal combustion engine 10, the temperature gradually rises as it travels. At this time, the resistance value of the drive coil 51 of the fuel injection valve 50 increases as the temperature rises. Therefore, the electromagnetic force is weakened due to reduction in the drive current flowing through the drive coil 51, and the injection amount may be reduced. As described above, the fuel injection amount in the fuel injection valve 50 is affected by the temperature.

In this regard, the correction unit 130 in the present embodiment performs the learning of the injection amount when it is travelling in the lean state after the temperature of the internal combustion engine 10 has risen and when the NOx purge is performed in which the air-fuel ratio temporarily fluctuates to the fuel-rich side and in which combustion is stable. Therefore, the learning is performed under the condition where the temperature environment is close to that in the lean state where higher accuracy is required, compared to the learning of the injection amount, for example, in the warm-up or when travelling in the stoichiometric state. Therefore, the injection amount in the lean state can be corrected with high accuracy. Further, the injection at the time of executing the NOx purge is used for the learning. Therefore, it is possible to suppress injection of excess fuel as compared with the configuration in which the fuel-rich state is exclusively created for the learning.

Secondly, it is preferable that the correction unit 130 learns the injection amount at the time of the partial lift injection. For example, the drive unit 110 divides the fuel injection in one cycle of the internal combustion engine 10 and controls the fuel injection valve 50 so that at least one fuel injection becomes the partial lift injection. In the partial lift injection, the injection amount at one time is smaller than that at the full lift injection. Therefore, the required injection amount in one cycle is satisfied by dividing the injection into multiple injections. The correction unit 130 learns the injection amount at the time of the partial lift injection among the divided injections. For example, when the fuel injection valve 50 performs the full lift injection as the first main injection and performs the partial lift injection as the second learning injection, the correction unit 130 learns the injection amount at the time of the second partial lift injection.

In the partial lift injection, as shown in FIG. 4, the valve body 53 does not reach the full lift position. Therefore, variation in the injection amount tends to be larger than that in the full lift injection. When the variation in the injection amount becomes large, the exhaust emission and the drivability may deteriorate. In this respect, the correction unit 130 learns the injection amount at the time of the partial lift injection, and therefore, the accuracy of the correction of the injection amount in the partial lift injection is improved.

When the fuel injection is divided, the drive unit 110 may control the injection to perform the first main injection in the former half of the intake stroke and to perform the second learning injection in the latter half of the intake stroke or in the latter half of the compression stroke. In this way, a predetermined interval is secured between the first injection and the second injection, and therefore, the influence of the first injection on the second injection is suppressed. When the second injection is performed in the latter half of the intake stroke, the amount of PN (exhausted fine particles) as discharged is suppressed as compared with the case where the injection is performed in the compression stroke. When the second injection is performed in the latter half of the compression stroke, the exposed area of the lateral surface of the cylinder at the time of the injection is smaller than that when the injection is performed in the former half of the compression stroke, and therefore, oil dilution and HO discharge caused by fuel adhering to the lateral surface can be suppressed.

The method of dividing the fuel injection is not limited to the above example. For example, when the engine load is high and when the required injection amount in one cycle is relatively large, the main injection may be performed twice and the learning injection may be performed once. The timing of the learning of the injection amount is not limited to the partial lift injection, and the learning of the injection amount may be performed at the time of the full lift injection.

Thirdly, when the operating state is the transient operating state, the amount of NOx discharged from the internal combustion engine 10 is not stable, and therefore, there is a concern that improper correction may be performed. Therefore, when the state determination unit 150 determines that the operation state is the transient operation state, it is preferable that the correction unit 130 does not learn the injection amount. In this way, it is possible to perform more appropriate correction as compared with the configuration in which the learning is performed in the transient operation state.

When the correction unit 130 performs corrections for multiple times, the drive unit 110 may fix these parameters (for example, injection pulse, and the like) so that the injection period or the injection amount in each correction becomes constant. The fuel pressure control unit 140 may fix the fuel pressure so that the fuel pressure of the fuel supplied to the fuel injection valve 50 in each injection becomes constant. By fixing these parameters, for example, even if the operating state at the time of the respective correction is different, the respective correction is performed under substantially the same conditions, and therefore, the learning accuracy can be improved.

When the learning of the injection amount of the fuel injection valve 50 is not completed, the correction unit 130 may correct the injection amount so that the injection amount becomes on the fuel-rich side as compared with the injection amount after the learning is completed. For example, the correction unit 130 may set the initial value of a target excess air ratio $\lambda$ to be on the fuel-rich side within a range, in which the excess air ratio $\lambda$ can be taken, from the start of the internal combustion engine 10 until the learning of the injection amount is completed. In this way, sufficient fuel can be secured even in a state where the learning of the injection amount is incomplete and where variation in the injection amount is likely to occur, and therefore, combustion before the learning becomes stable.

After the learning is completed, the fuel concentration may be set relatively thin by using the learning result, and therefore, the fuel consumption can be improved. By reducing the fuel concentration to the lean limit, fuel efficiency can be further improved.

Figure 5:
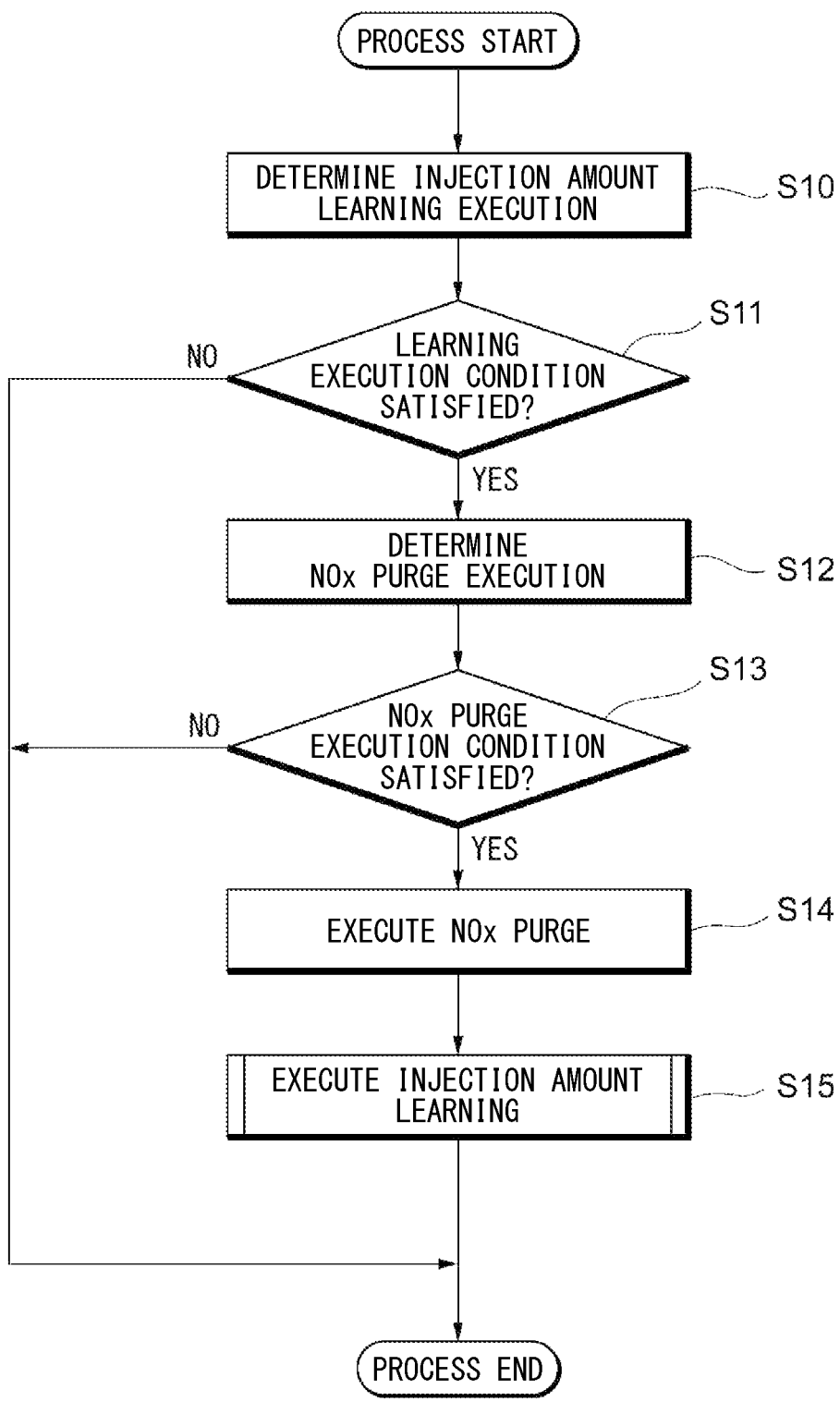
FIG. 5 is a flowchart showing a flow of processing executed by the control device shown in FIG. 1.

Next, the flow of the processing executed by the control device 100 will be described with reference to FIG. 5. FIG. 5 is a flowchart showing a flow of processing for determining the execution of the learning of the injection amount. The series of the processing shown in FIG. 5 may be periodically and repeatedly executed in the control device 100 every time a predetermined period elapses.

In the first step S10, it is determined whether or not the execution condition for executing the learning of the injection amount is satisfied. In the present embodiment, it is determined that the execution condition is satisfied when all of the following conditions are satisfied: that the internal combustion engine 10 is not in the transient operation state; that the fuel is not being cut; that the water temperature and the oil temperature are within the predetermined ranges; that the fuel pressure is equal to or higher than the predetermined value; that the battery voltage is equal to or higher than the predetermined value; that the predetermined period has elapsed since the internal combustion engine 10 has started; that no abnormality arises in the on-off valve detection function; that no abnormality arises in the communications between the ASIC and the microcomputer included in the control device 100. For example, by not executing the learning of the injection amount when the fuel pressure is less than the predetermined pressure, the correction under the condition that the injection amount is not stable is avoided, and therefore, the learning accuracy is improved.

Each of the parameters, such as the water temperature, the oil temperature, and the fuel pressure under each of the above conditions is measured by using the water temperature sensor 14, the oil temperature sensor 62, and the fuel pressure sensor 45, and is input to the control device 100. The learning execution condition is not limited to satisfying all of the above conditions and may be to satisfy a part of the conditions.

When the above execution condition is satisfied (step S11: Yes), the process proceeds to step S12. When the above execution condition is not satisfied (step S11: No), the series of the processing shown in FIG. 5 is terminated. In this way, the injection amount is learned when the execution condition is satisfied, and therefore, the learning is performed under the stable condition. Further, the learning in each of the multiple fuel injection valves is performed under substantially the same conditions, and therefore, variations in the injection amount of the fuel injection valves among the cylinders can be suppressed.

In step S12, it is determined whether or not the execution condition for executing the NOx purge is satisfied. In the present embodiment, it is determined that the NOx purge execution condition is satisfied when at least one of the following conditions is satisfied: that the amount of NOx occluded in the NOx occlusion catalyst 32 is equal to or greater than a predetermined amount, that a request to switch from the lean state to the stoichiometric state arises, and that the target value of the excess air ratio $\lambda$ is less than or equal to a predetermined value (that is, the fuel rich side).

When the above execution condition is satisfied (step S13: Yes), the process proceeds to step S14, and the NOx purge is performed. When the above execution condition is not satisfied (step S11: No), the series of the processing shown in FIG. 5 is terminated.

In step S15 following step S14, the correction unit 130 corrects the injection amount, and the process ends.

The injection amount is learned by periodically executing the above processing steps for multiple times. The processing steps are executed for each of the multiple cylinders included in the vehicle. That is, the injection amount is learned for all the fuel injection valves. In this way, not only the variation in the injection amount of the fuel injection valve alone is suppressed, but also the variation in the injection amount of the fuel injection valve between the cylinders is suppressed.

Figure 6:
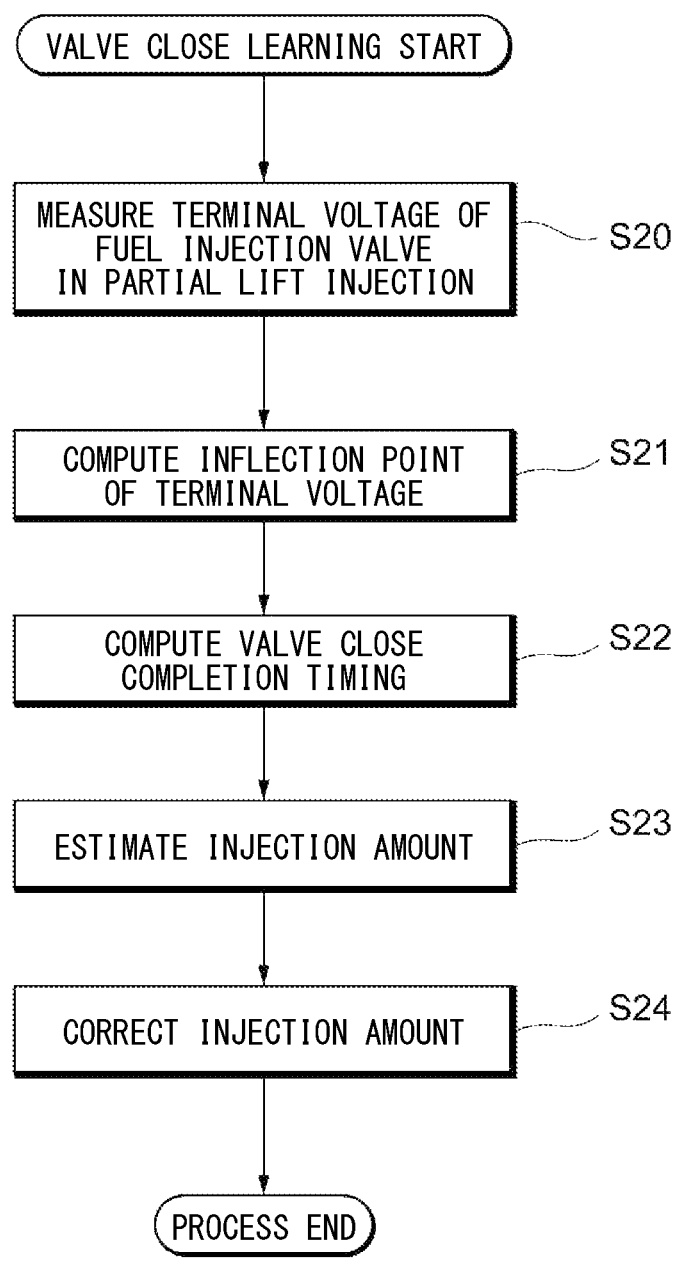
FIG. 6 is a flowchart showing a specific example of correction process of an injection amount.

A specific method of the learning of the injection amount in step S15 shown in FIG. 5 will be described with reference to FIG. 6. FIG. 6 shows a flow of processing executed when the injection amount is estimated based on the valve close drive of the fuel injection valve 50. In this specific example, the correction unit 130 will be described as performing the learning at the time of the partial lift injection.

As shown in FIG. 6, in the first step S20, the measurement unit 120 measures the voltage of the negative terminal P2 of the fuel injection valve 50 at the time of the partial lift injection. The voltage is measured by, for example, using an ASIC or a microcomputer included in the control device 100 to acquire the voltage of the negative terminal P2 in chronological order after fuel injection.

In step S21 following step S20, the measurement unit 120 computes the inflection point from the waveform of the measured terminal voltage. As described above, when the fuel injection valve 50 is closed, an induced electromotive force is generated, and therefore, an inflection point occurs in the waveform of the terminal voltage.

In step S22 following step S21, the measurement unit 120 computes the valve close completion timing of the fuel injection valve 50 based on the computed inflection point. As described above, the timing at which the inflection point occurs corresponds to the timing at which the valve body 53 returns to the valve close position.

In step S23 following step S22, the correction unit 130 estimates the injection amount based on the computed valve close completion timing of the fuel injection valve 50. As described above, the injection amount is estimated, for example, with reference to the data of the nominal product stored in the storage unit 160.

In step S24 following step S23, the correction unit 130 computes the correction amount of the target fuel injection valve 50 based on the estimated injection amount and corrects the injection amount based on the correction amount. In this way, the injection amount correction process is completed.

It is noted that, the method of the estimation of the injection amount is not limited to the method based on the valve close drive of the fuel injection valve as described above. For example, as described below, the injection amount may be estimated based on the valve open drive of the fuel injection valve.

Figure 7:
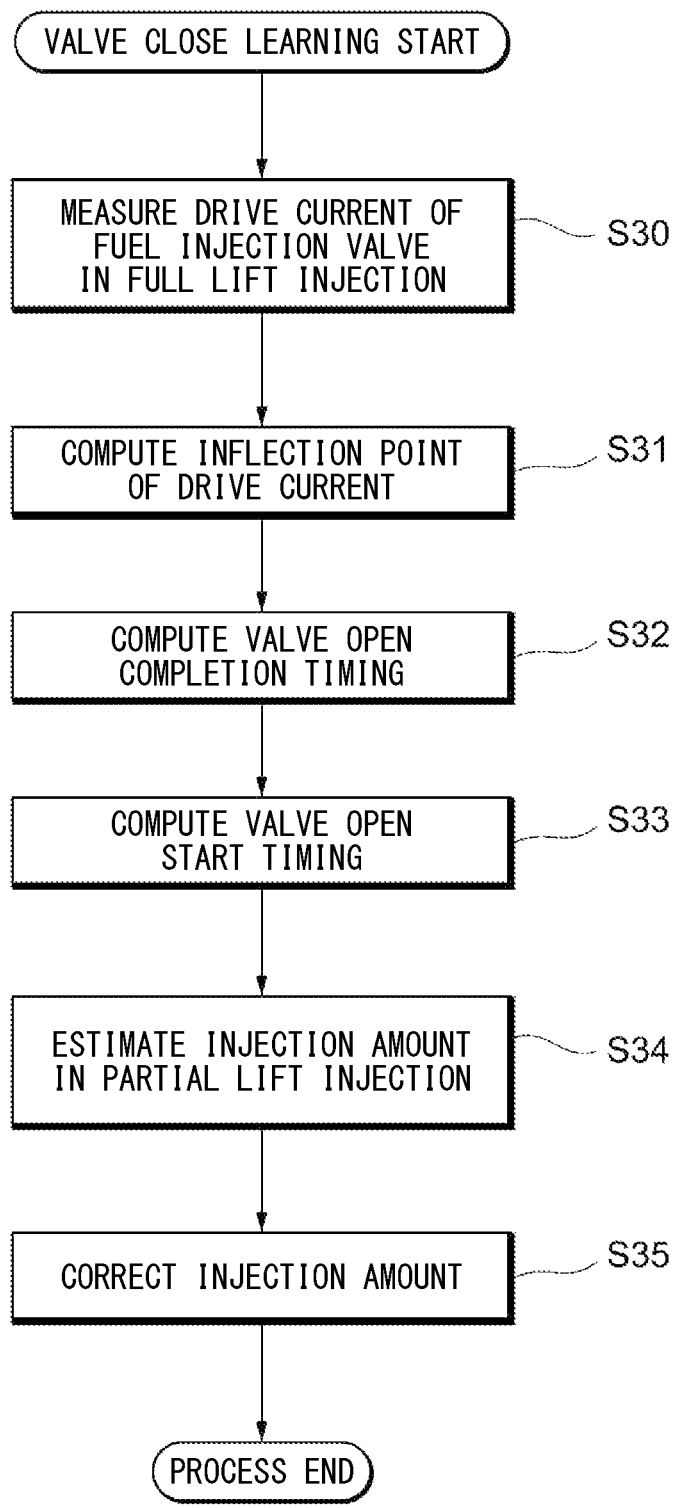
FIG. 7 is a flowchart showing a specific example of correction process of the injection amount.

FIG. 7 shows a flow of processing executed when the injection amount is estimated based on the valve open drive of the fuel injection valve 50. In this specific example, the correction unit 130 is supposed as performing the learning at the time of the partial lift injection. It is noted that, in the start of the valve open drive, both the full lift injection and the partial lift injection show similar behavior. Therefore, a method of estimating of the injection amount in the partial lift injection by using the valve open start timing in the full lift injection will be described as an example.

As shown in FIG. 7, in the first step S30, the measurement unit 120 measures the drive current flowing through the drive coil 51 of the fuel injection valve 50 at the time of the full lift injection.

In step S31 following step S30, the measurement unit 120 computes the inflection point from the waveform of the measured drive current. As described above, at the valve open completion timing of the fuel injection valve 50, the drive current that has gradually reduced starts to increase, and therefore, an inflection point occurs in the current waveform.

In step S32 following step S31, the measurement unit 120 computes the valve open completion timing of the fuel injection valve 50 based on the computed inflection point. As described above, the timing at which the inflection point occurs corresponds to the timing at which the valve body 53 reaches the full lift position.

In step S33 following step S32, the measurement unit 120 computes the valve open start timing based on the computed valve open completion timing. The measurement unit 120 may compute, for example, the valve open speed of the fuel injection valve 50 based on the change in the drive current while the fuel injection valve 50 performs the valve open drive. Further, the valve open start timing may be computed based on the computed valve open speed and the valve open completion timing.

In step S34 following step S33, the correction unit 130 estimates the injection amount in the partial lift injection based on the computed valve open start timing in the full lift injection of the fuel injection valve 50. As described above, the injection amount is estimated, for example, with reference to the data of the nominal product stored in the storage unit 160.

In step S35 following step S34, the correction unit 130 computes the correction amount of the target fuel injection valve 50 based on the estimated injection amount and corrects the injection amount based on the correction amount. In this way, the injection amount correction process is completed.

It is noted that, the injection amount correction method is not limited to the method shown in FIGS. 6 and 7. For example, the correction unit 130 may compute both the valve open start timing and the valve close completion timing of the fuel injection valve by combining the above methods and may estimate the injection amount by computing the valve open period of the fuel injection valve based on the difference between these two timings.

The control device and the control method thereof described in the present disclosure may be embodied with one or more special computer provided with at least one processor and at least one memory programmed to execute one or more functions embodied with a computer program. The control device and the control method described in the present disclosure may be embodied with a special computer provided with at least one processor that includes at least one special hardware logic circuit. The control device and the control method thereof described in the present disclosure may be embodied with at least one special computer provided with a combination of a processor and a memory programmed to implement one or more functions and at least one processor provided with at least one hardware logic circuit. The computer program may be stored, as instructions executable by a computer, in a tangible non-transitory computer-readable medium. The special hardware logic circuit and the hardware logic circuit may be embodied with a digital circuit including multiple logic circuits or may be embodied with an analog circuit.

The present embodiments have been described with reference to specific examples above. However, the present disclosure is not limited to those specific examples. Those specific examples subjected to an appropriate design change by those skilled in the art are also encompassed in the scope of the present disclosure as long as the changed examples have the features of the present disclosure. Each element included in each of the specific examples described above and the placement, condition, shape, and the like of each element are not limited to those illustrated, and can be changed as appropriate. The combinations of elements included in each of the above described specific examples can be appropriately modified as long as no technical inconsistency occurs.

What is claimed is:

1. A control device comprising:
a drive unit configured to supply electric power to a fuel injection valve to perform valve open drive to supply fuel to a combustion chamber of an internal combustion engine; and
a correction unit configured to correct a fuel injection amount of the fuel injection valve, wherein
a NOx occlusion catalyst is provided in an exhaust pipe of the internal combustion engine to occlude NOx in exhaust gas that flows through the exhaust pipe to reduce and purify occluded NOx, and
the correction unit is configured to learn the fuel injection amount of the fuel injection valve when NOx purge is performed to reduce and purify the NOx occlusion catalyst;
a measurement unit configured to, when the valve open drive is performed, measure a drive current, which flows in the fuel injection valve, and/or a drive voltage, which is applied to the fuel injection valve;
the correction unit is configured to correct the electric power supplied by the drive unit based on a measurement result of the measurement until to correct the fuel injection amount of the fuel injection valve; and
the correction unit is configured to learn a valve open timing of the fuel injection valve and/or a valve close timing of the fuel injection valve based on the drive current and/or the drive voltage to learn the fuel injection amount when the fuel injection valve performs partial lift injection.

2. The control device according to claim 1, wherein
the drive unit is configured to divide fuel injection in one cycle of the internal combustion engine such that at least one of the fuel injection performs the partial lift injection.

3. The control device according to claim 2, wherein
the drive unit is configured to set to perform the partial lift injection in a latter half of an intake stroke or in a latter half of a compression stroke.

4. The control device according to claim 1, wherein
the drive unit is configured to fix an injection period or the fuel injection amount in the partial lift injection that is for learning.

5. The control device according to claim 1, further comprising:
a fuel pressure control unit configured to control a fuel pressure of fuel supplied to the fuel injection valve, wherein
the fuel pressure control unit is configured to fix the fuel pressure when the correction unit learns the fuel injection amount.

6. The control device according to claim 1, wherein
the correction unit is configured not to learn the fuel injection amount when a fuel pressure of fuel supplied to the fuel injection valve is less than a predetermined pressure.

7. The control device according to claim 1, wherein
the correction unit is configured, when learning of the fuel injection amount of the fuel injection valve is not completed, to correct the fuel injection amount to a fuel-rich side as compared with the fuel injection amount after the learning is completed.

8. The control device according to claim 1, further comprising:
a state determination unit configured to determine whether the internal combustion engine is in a steady operation state or in a transient operation state, wherein
the correction unit is configured not to learn the fuel injection amount when the state determination unit determines that the internal combustion engine is in the transient operation state.

9. A control device comprising:
a processor configured to
supply electric power to a fuel injection valve to open the fuel injection valve to supply fuel to a combustion chamber of an internal combustion engine,
determine whether NOx purge is performed to reduce and purify a NOx occlusion catalyst that is provided in an exhaust pipe of the internal combustion engine to occlude NOx contained in exhaust gas in the exhaust pipe to reduce and purify occluded NOx,
learn a fuel injection amount of the fuel injection valve on determination that the NOx purge is performed,
correct the fuel injection amount of the fuel injection valve;
when a valve open drive is performed to supply the fuel to the combustion chamber of the internal combustion engine, measure a drive current, which flows in the fuel injection valve, and/or a drive voltage, which is applied to the fuel injection valve;
correct the supplied electric power based on a measurement result of the measured drive current and/or the measured drive voltage to correct the fuel injection amount of the fuel injection valve; and
learn a valve open timing of the fuel injection valve and/or a valve close timing of the fuel injection valve based on the drive current and/or the drive voltage to learn the fuel injection amount when the fuel injection valve performs partial lift injections.

10. A control device comprising:
a drive unit configured to supply electric power to a fuel injection valve to perform valve open drive to supply fuel to a combustion chamber of an internal combustion engine; and
a correction unit configured to correct a fuel injection amount of the fuel injection valve, wherein
a NOx occlusion catalyst is provided in an exhaust pipe of the internal combustion engine to occlude NOx in exhaust gas that flows through the exhaust pipe to reduce and purify occluded NOx;
the correction unit is configured to learn the fuel injection amount of the fuel injection valve when NOx purge is performed to reduce and purify the NOx occlusion catalyst;
the control device further comprises a fuel pressure control unit configured to control a fuel pressure of fuel supplied to the fuel injection valve; and the fuel pressure control unit is configured to fix the fuel pressure when the correction unit learns the fuel injection amount.

* * * * *